FIG. I.

(No Model.) 5 Sheets—Sheet 2.

G. R. KING & A. RAYMOND.
UNDER RUN ROLLER PULVERIZING MILL.

No. 583,059. Patented May 25, 1897.

WITNESSES:

INVENTORS
George R. King
Albert Raymond
BY Frank H. Johnson
ATTORNEY.

(No Model.) 5 Sheets—Sheet 3.

G. R. KING & A. RAYMOND.
UNDER RUN ROLLER PULVERIZING MILL.

No. 583,059. Patented May 25, 1897.

WITNESSES:

INVENTORS
George R. King,
Albert Raymond
BY Frank G. Johnson
ATTORNEY.

(No Model.) 5 Sheets—Sheet 4.
G. R. KING & A. RAYMOND.
UNDER RUN ROLLER PULVERIZING MILL.
No. 583,059. Patented May 25, 1897.
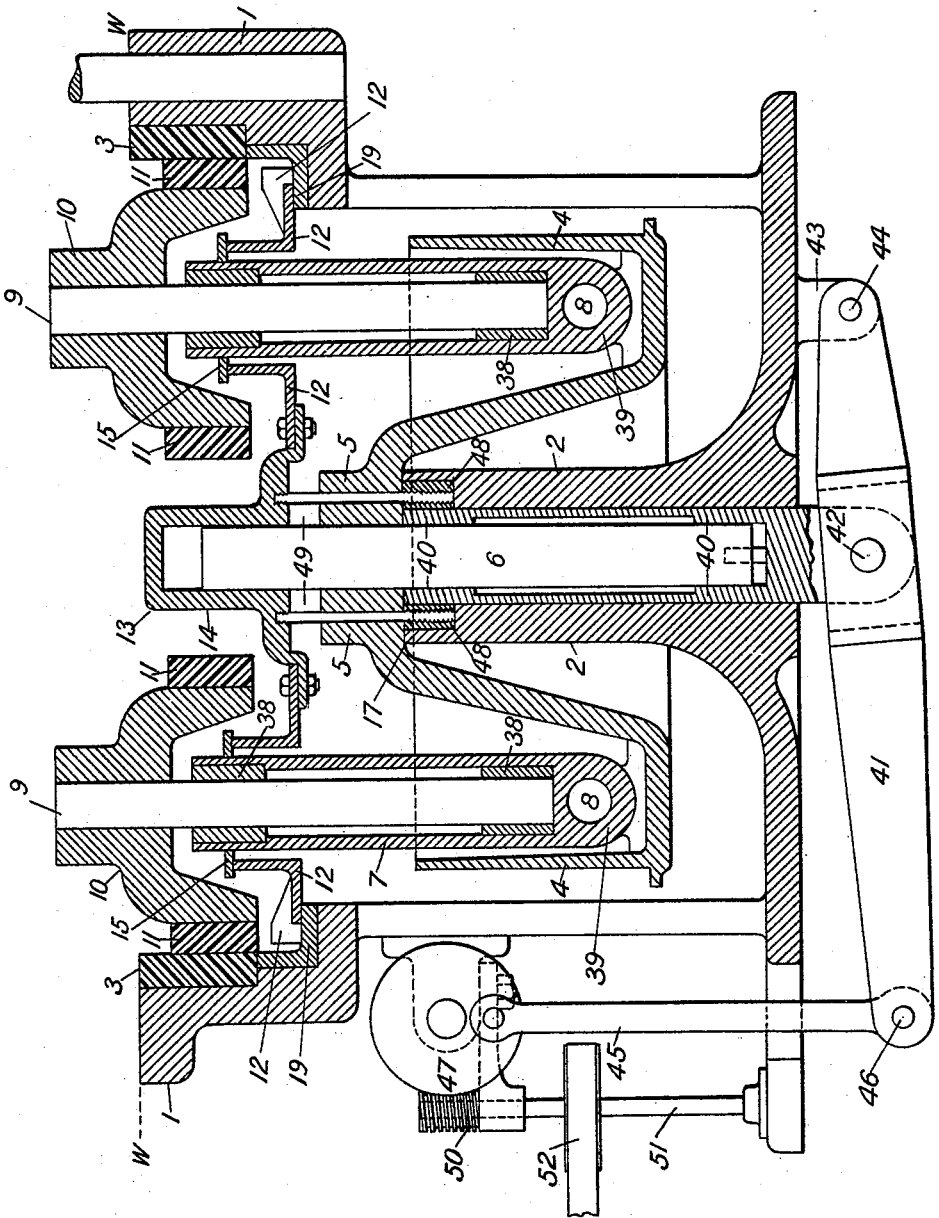
WITNESSES:
A. W. Mitchell
C. C. Kay.
INVENTORS
George R. King
Albert Raymond
BY Frank G. Johnson
ATTORNEY.

(No Model.) 5 Sheets—Sheet 5.
G. R. KING & A. RAYMOND.
UNDER RUN ROLLER PULVERIZING MILL.
No. 583,059. Patented May 25, 1897.
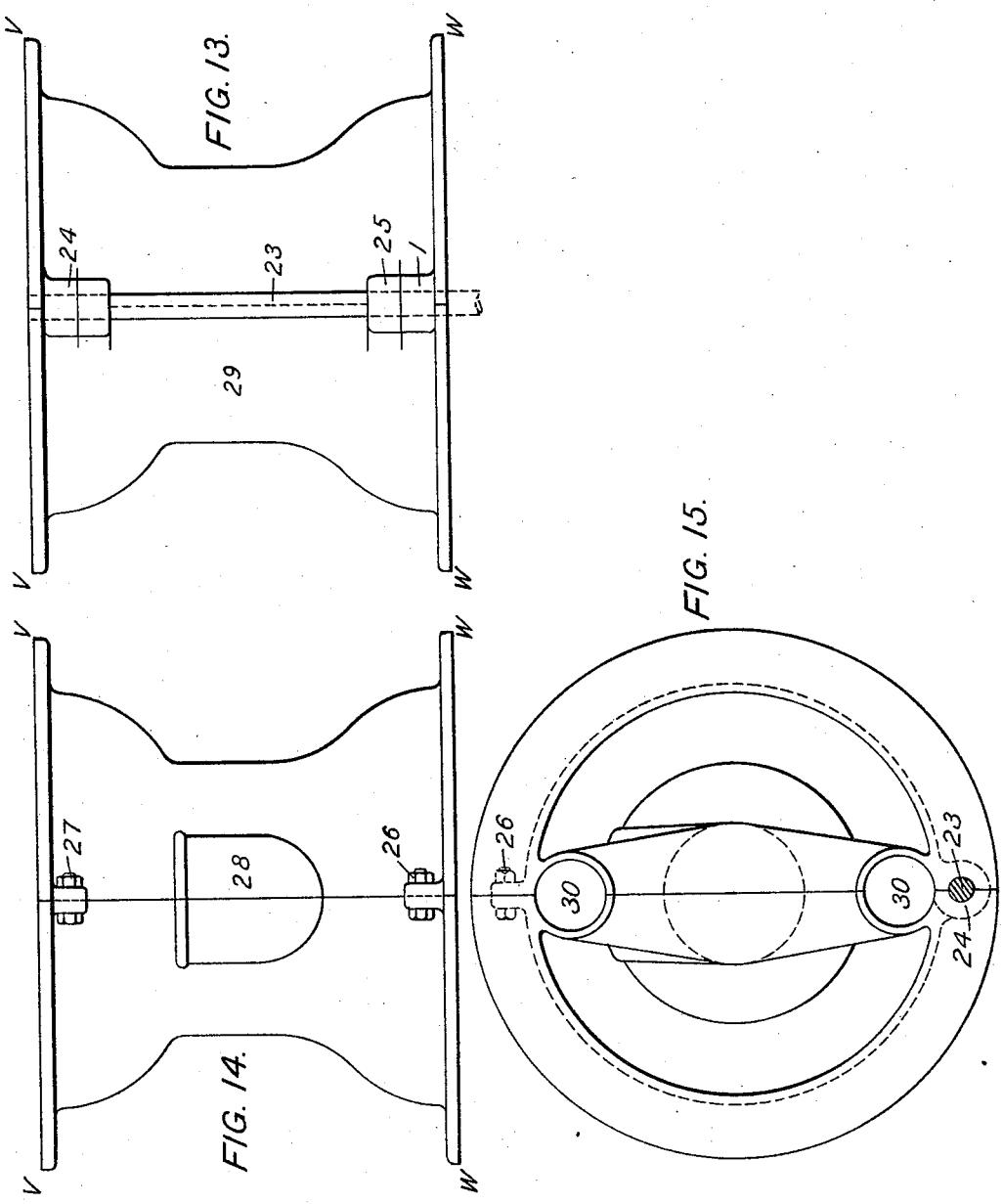
WITNESSES:
C. C. Kay
A. W. Mitchell
INVENTORS
George R. King
Albert Raymond
BY Frank G. Johnson
ATTORNEY.

UNITED STATES PATENT OFFICE.

GEORGE R. KING, OF NEW YORK, N. Y., AND ALBERT RAYMOND, OF CHICAGO, ILLINOIS.

UNDERRUN-ROLLER PULVERIZING-MILL.

SPECIFICATION forming part of Letters Patent No. 583,059, dated May 25, 1897.

Application filed July 27, 1896. Serial No. 600,719. (No model.)

*To all whom it may concern:*

Be it known that we, GEORGE R. KING, residing in the city, county, and State of New York, and ALBERT RAYMOND, residing in the city of Chicago, in the county of Cook and State of Illinois, citizens of the United States, have invented a new and useful Underrun-Roller Pulverizing-Mill, of which the following is a specification.

Our invention relates to improvements in that class of pulverizing machines or mills which have for their object the reduction to a fine powder of various substances, as lime, gypsum, quartz, ores, coal, &c.

The objects of our invention are to simplify the construction and increase the durability and effectiveness of such mills and render them less expensive and less exhaustive of power to run them, all of which we attain by the mechanism illustrated in the accompanying drawings, in which—

Figure 1:
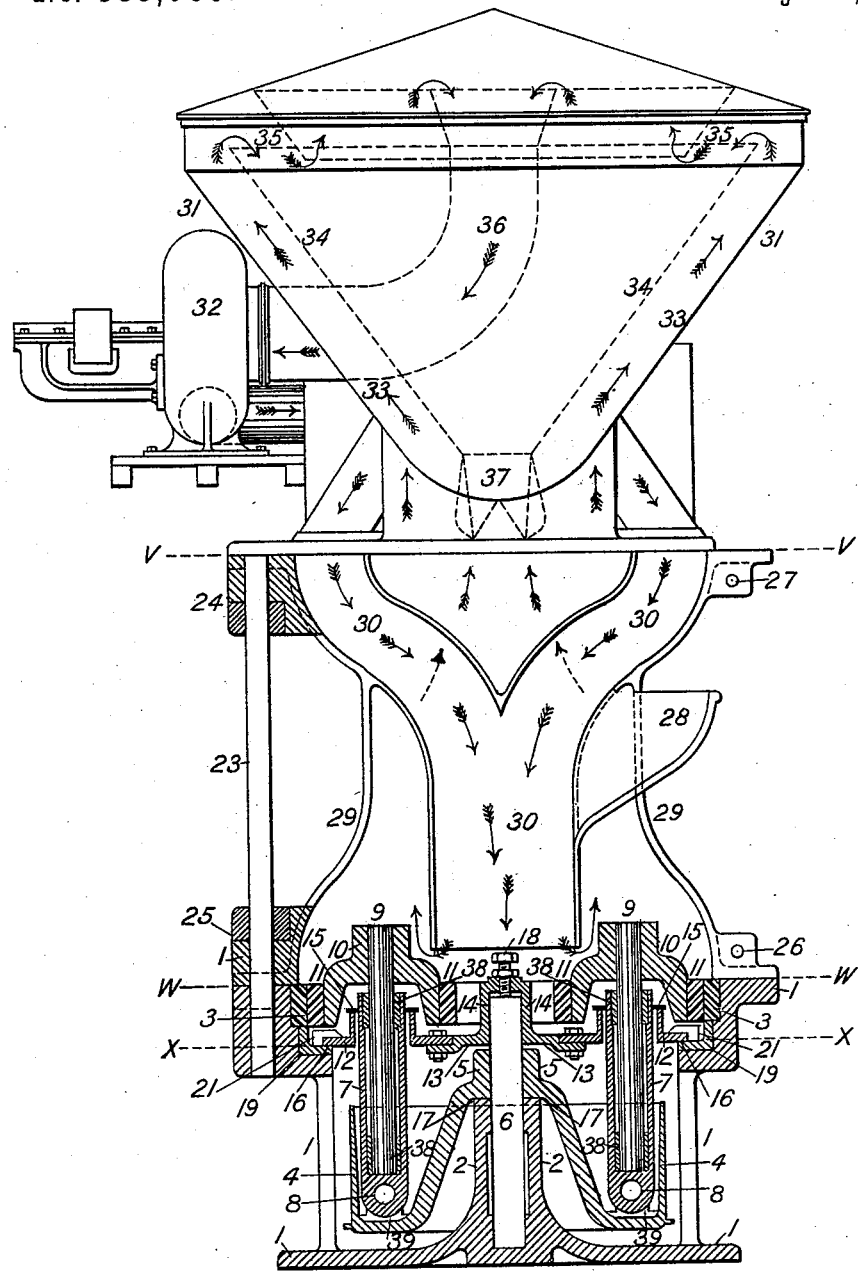
Figure 2:
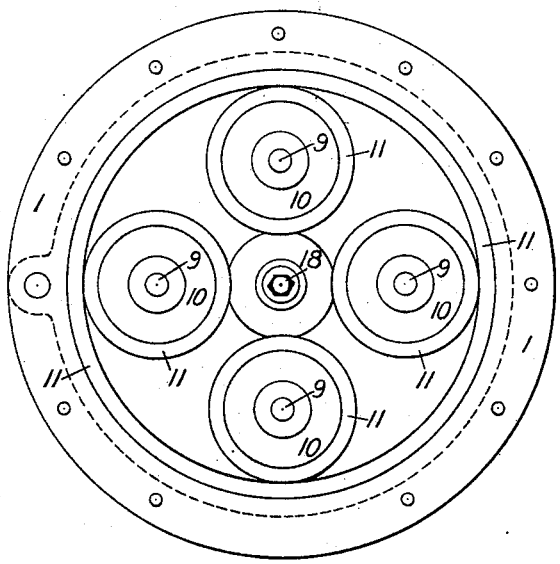
Figure 3:
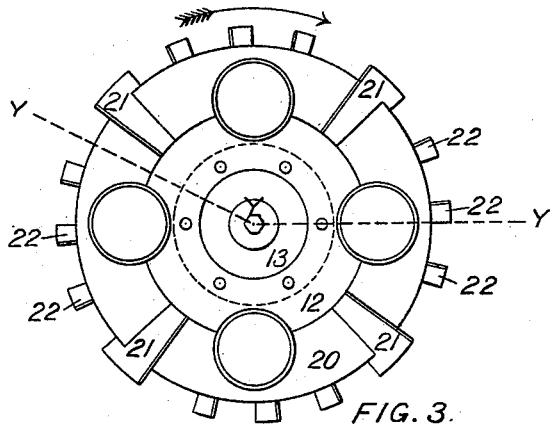
Figures 5, 6:
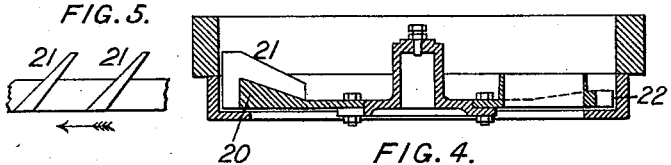
Figure 4:
Figure 7:
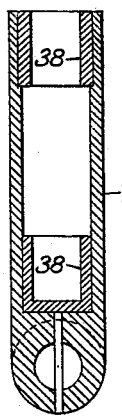
Figure 8:
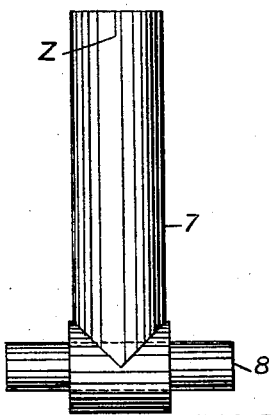
Figure 11:
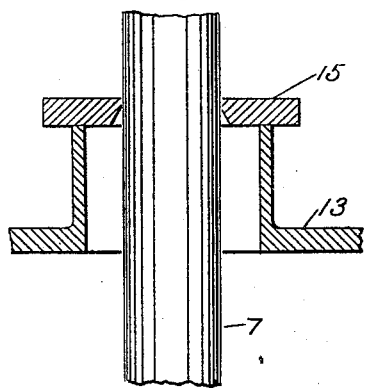
Figure 9:
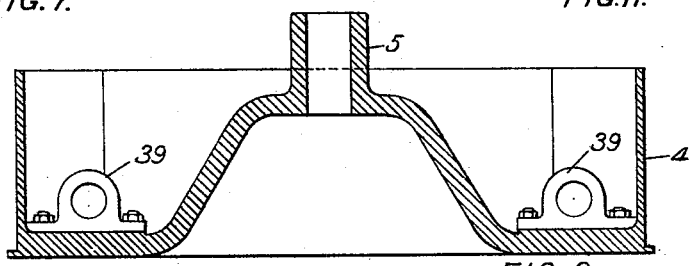
Figure 10:
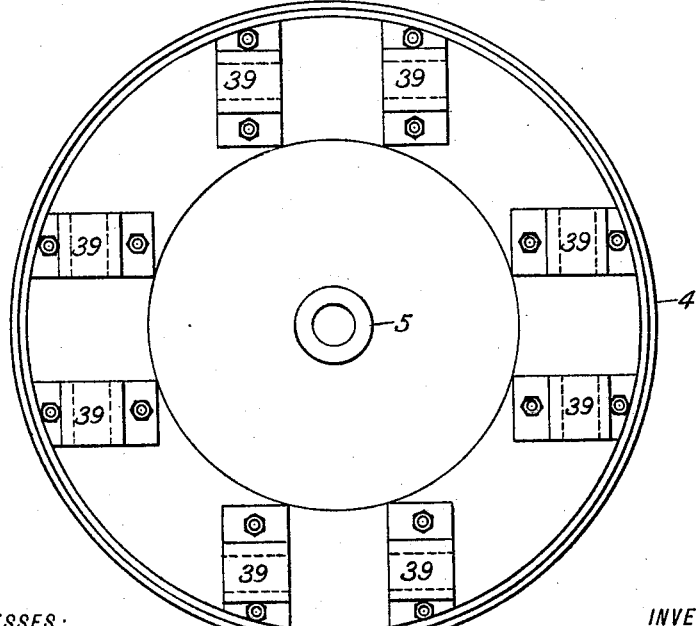

Figure 1, below the line $vv$, is a vertical section, and above the line $v\ v$ is shown a separator attached to the mill; Fig. 2, a view of Fig. 1 on the line $w\ w$, looking downward; Fig. 3, a plan of Fig. 1 on the line $x\ x$ with die and casing removed; Fig. 4, a view of Fig. 3 on the line $y\ y\ y$ of Fig. 3. Fig. 5 represents large radial inclined scrapers and feeders. Fig. 6 represents small radial inclined scrapers and feeders. Fig. 7 is a vertical section of numeral 7 on the line $z\ z$ of Fig. 8; Fig. 8, a side elevation of numeral 7, showing a trunnion-pin; Fig. 9, a vertical section of the driving and carrying pulley, showing the trunnion-bearings; Fig. 10, a horizontal top view of Fig. 9, also showing the trunnion-bearings. Fig. 11 is a view of a portion of Fig. 1. Fig. 12 is a vertical section of the working parts of the mill, showing some modifications and an additional feature. Figs. 13 and 14 are elevations of the casing between and at right angles to the lines V V and W W in Fig. 1, Fig. 13 being the view opposite to Fig. 14 and Fig. 14 the view opposite to Fig. 13; Fig. 15, a transverse section of Figs. 13 and 14, taken on the line V V of Fig. 1. Figs. 7, 8, 9, 10, 11, and 12 are much enlarged views.

Similar designating-numerals refer to similar parts throughout the several views.

Before enumerating and explaining in detail the several parts of our device we will state that by the nature of our invention it depends for its action on centrifugal force of reciprocally-balanced rollers (two or more, but preferably four) rapidly rolling on the inner face of an annular die, each of said rollers being mounted on the top of a vertical shaft, whereby these shafts, also the driving and carrying pulley and all other working parts of the mill, (except the rollers,) are wholly excluded from and unobstructed by the material to be and being pulverized.

We will now point out and explain the operation of the several parts of our device and set forth what we claim as new and useful in our invention.

1 is a cast-iron chamber inclosing and in which are operated all the working parts of the mill. From the central part of the base of this chamber, extending upward, is a sleeve-post or hollow stanchion 2, which carries the operating-shaft 6, and upon which said shaft is mounted and operated all the other working parts of the mill.

3 is an annular steel die securely fastened into a corresponding recess in the top of the inclosing chamber.

4 is a horizontal and operating pulley, its hub 5 being secured to the main shaft 6 just above the supporting sleeve-post 2.

7 7 are roller-shaft sleeves in which the roller-shafts 9 9 are held and operated in suitable bearings at the top and bottom thereof. These roller-shaft sleeves are secured at the lower end to the operating-pulley 4 by trunnion-bearings 39 to allow the upper end of the said sleeves to have a horizontal radial movement.

10 10 are cast-iron rollers recessed or concaved at the bottom to afford more vertical space for other parts and are securely fastened to the top of the roller-shafts 9 9 and faced or surrounded with steel bands 11 11, corresponding to the inner face of the annular die, against which they revolve, being shrunk on or otherwise securely fastened to the said centers, the said bands being, of course, in vertical juxtaposition with the said annular steel die. These centers and bands constitute the rollers.

12 12 and 13, taken together, constitute a horizontal diaphragm or division-plate of peculiar construction which prevents the material to be pulverized from falling below the grinding part of the mill. Instead of making this diaphragm all in one piece the central portion of it, 13, is bolted to the outer or annular portion 12 simply to facilitate the making, handling, and placing of it. This diaphragm is provided with a hub 14 at the center, which is keyed to the upper end of the operating-shaft 6, and at the points where the roller-shaft sleeves 7 7 pass through it it is provided with upward-extending tubular openings sufficiently large to admit of the necessary horizontal radial movement of the roller-shaft sleeves. To close these tubular openings, which, as stated, are larger than the said sleeves, the flat annular rings 15 15, which are only large machine-fitted washer-caps, are slipped over the top of the roller-shaft sleeves and rest by their own weight on the top of the tubular openings of the diaphragm, on which the said washers have a free horizontal radial motion with the top of the roller-shaft sleeves. (Shown best in Fig. 11.) The outer edge of this diaphragm rests upon the upper face of the horizontal arm of the right-angled ring 19, fitted into a corresponding recess formed in the inclosing chamber. Another peculiar feature about this diaphragm, which, for want of room, is not shown in Fig. 1, is represented by 20 in Fig. 4, which is a dished centrifugal distributing-floor or inverted conical surface, whereby the material to be pulverized, when thrown outward by centrifugal force, is also thrown upward and between the rollers and annular die. The fit between the outer edge of the diaphragm and the horizontal arm of the right-angled ring 19 need not be one of absolute contact, as the upward current of air, caused by the rapid rotation of the mill, will prevent the material to be pulverized from falling through a clearance opening or space between the two parts in question. To nicely adjust this clearance, (before the diaphragm is keyed to the shaft 6,) the set-screw 18 at the top of the hub of the diaphragm is provided, whereby the diaphragm can be slightly lowered or raised. This diaphragm is also provided upon its outer edge with two sets of radial inclined feed-wings or scrapers, one set larger than the other and alternated between each other. (Best shown in Figs. 3, 4, 5, and 6, in which 21 represents the larger and 22 the smaller.) The reason for making some of these scrapers smaller is because there is not room to make them all as large as the larger ones.

28 is the hopper, into which is fed the material to be pulverized.

29 is a cast-iron irregular cylindrical case attached to the top of the inclosing chamber 1, thus covering the mechanical parts of the mill, and which is provided with a central bifurcated pipe 30 for supplying a return downdraft of air for carrying off such portions of the material as become sufficiently pulverized, the down-current of air being created by an upward current outside of the said central pipe by the action of the mill.

As a convenient means of obtaining access to all parts of the mill in putting it together, inspecting its condition, reparing it, &c., the said irregular cylindrical case is made in two equal halves and hinged and held together on one side by the rod 23 and hinges 24 and 25, Fig. 1, and secured on the other side by the clamping-bolts 26 and 27.

Above the line v v are shown an attached separator 31 and a suction-blower 32.

Though the separator is not a part of the mill proper, some sort of separator is usually employed in connection with dry-pulverizing mills, and therefore we will briefly describe the one herein shown. It consists, in the lower part, of two inverted conic-shaped vessels 33 and 34, one being placed within the other, having a space between them, and at the top an inverted truncated cone 35, projecting slightly into the top of the cone-shaped vessel 34, leaving a space between them, whereby an indirect current of air between them is created by the suction-pipe 36, connected with the suction-blower 32. At the bottom of the inverted-cone vessels 33 and 34 is provided an automatic valve 37, which opens into the irregular cylinder 29, to allow the accumulated insufficiently-triturated particles of material to fall back into the mill to be further reduced.

The modification and additional feature alluded to in the description of the drawings are shown by the enlarged vertical section of the mechanical part of the mill, Fig. 12. The objects of this modification are to provide an up-and-down sliding motion and friction action between the rollers and the die, as well as the rolling and crushing action and to render the mill more effective, and also to prevent an irregular wear of the rollers and die.

Referring to Fig. 12, it will be seen that 40 is an up-and-down sliding sleeve within the sleeve-post 2 2, and it extends down through the base of the inclosing chamber and by the pin 42 is connected to the horizontal lever 41, the short arm of the lever being secured to the bracket 43 on the bottom of the base of the inclosing chamber by the pin 44. The long arm of the lever is connected to the vertical working rod 45 by the pin 46 and the upper end of the working rod to the crank-disk 47, which said crank-disk is operated by any suitable well-known means—such as, for example, gearing, or shafts, pulleys, and belts, or a combination of such devices connected to any suitable device whereby it will be rotated. The main operating-shaft 6 is held by and rotates in the vertical-acting sleeve 40, to which is keyed the hub 5 of the operating-pulley 4, and to which is secured, by the trunnion-bearings, the bottoms of the several roller-shaft sleeves, as before described. Into the top of the sleeve-post 2 is recessed a horizontally-rotating sleeve 48, and into the top of this sleeve is screwed a series of upward-extending rods 49, each of which pass loosely through the hub of the operating-pulley 4, and upper ends are screwed into the central part of the diaphragm 13. It will be seen that in this modification the annular die 3 is much deeper than bands 11 of the rollers. To prevent any vertical movement of the diaphragm, it is held stationary by the series of rods 49, which rigidly connect it (vertically) to the top of the sleeve-post 2, while it is free to horizontally revolve; but these rods do not interfere with the vertical action of the hub of the operating-pulley, through which they loosely pass. The explanation of the operation of the mill as it relates to this modification is as follows:

When the mill is in operation, the raising and lowering of the long arm of the lever 41 by means of the working rod 45 and crank-disk 47 correspondingly raises and lowers the sleeve 40, which correspondingly raises and lowers the working shaft 6, and which also raises and lowers the working pulley 4, and thus gives an up-and-down motion to the several rollers, which results in giving a more or less vertical sliding motion and consequently a friction and grinding action of the face of the rollers on the face of the die and a horizontally zigzag traveling motion of the former on the latter, whereby results a more even wear to rollers and die.

Of course the relative velocity of the mill and the crank-disk is to be so adjusted as not to allow the rollers to always travel in the same track over the face of the die.

Having pointed out the several parts of our device and more or less alluded to their several functions, only a brief further explanation of the operation of our invention is needed.

The material to be pulverized is fed into the hopper 28, which first falls upon the central portion of the diaphragm midway between the several rollers. The material, by rapid rotation of the diaphragm, is next thrown by centrifugal force to the outer portion of the diaphragm and up the radial inclined plane thereof to the action of the rollers and the annular die. The two series of radial inclined blades or scrapers (the larger and smaller) act to stir up and feed to the rollers the material to be pulverized and create an upward current of air which carries off the material as fast as it is sufficiently pulverized and keeps a constant supply of material between the rollers and die, while the rising material which is insufficiently reduced falls back upon the diaphragm and by the same process reënters between the rollers and die for further trituration. The action of the blower and separator, besides separating and drawing off the fine material and dropping back the insufficiently-pulverized particles, also assists in creating an upward current through the mill.

One of the great advantages and merits of our invention is that by means of the under-run of the rollers and the separating-diaphragm 12 and 13 the working parts of the mill (except the rollers) are wholly unencumbered by the material to be pulverized, which greatly diminishes the wear of the mill.

Another leading advantage and merit of our device is that all the bearings which have any appreciable action—namely, the main or central shaft and each of the roller-shafts—sustains and carries its load and rotates on a steel foot (not shown except on the operating-shaft 6 in Fig. 12) in sleeve-sockets, which can be kept constantly filled with oil and free from all grit, whereby the frictional resistance, as well as wear, is kept at a minimum. In fact, by our device there is next to no friction in the working parts of the mill, so that the power applied is exhausted only by the crushing and grinding of the material itself.

By mounting the roller-shafts directly to or on the driving-pulley, which is sustained by and rotated on a steel foot, (shown in Fig. 12,) the simplicity of the construction is complete.

We are aware that various horizontal acting centrifugal-roller pulverizing-mills have been made and patented. Therefore we do not claim, broadly, the use of horizontal-acting rollers irrespective of the method of operating them and the general construction of such mills.

What we claim as new and useful, and desire to secure by Letters Patent, is—

1. In a centrifugal pulverizing-mill the combination of the annular die 3 rollers 10 roller-shafts 9, having the said rollers mounted on the top of the said shafts, the carrying-pulley 4 and sleeves 7, having the trunnion-bearings 8 at the bottom on the said carrying-pulley, central shaft 6, having mounted thereon the said carrying-pulley, the diaphragm 12 and 13, having tubular openings for the roller-shafts 9, the adjustable closing washer-caps 15, the said diaphragm being fastened to, supported and operated by the said central shaft and having the inverted conical surface 20 and radially-inclined feed-scrapers 21 and 22, as and for the purpose set forth.

2. In a centrifugal-roller pulverizing-mill a series of two or more rollers mounted on the upper ends of a corresponding series of two or more vertical roller-shafts said shafts having trunnion-bearings at the lower end thereof on a supporting and operating pulley, the said pulley having its support on a vertical central operating-shaft, in combination with an inclosing chamber, having an annular die, and a revolving diaphragm under the said rollers, having openings through which said roller-shafts extend below it, whereby the operating mechanism underneath the said diaphragm is free from and unobstructed by the material pulverized, substantially as set forth.

3. In a centrifugal pulverizing-mill, a series of two or more rollers mounted on the upper ends of a corresponding series of two or more vertical roller-shafts, said shafts having trunnion-bearings at the lower ends thereof on a supporting and operating pulley, the said pulley having its support on and operated by a central vertical shaft, the said central shaft having its vertical support on a vertically-acting lever operated by any ordinary means, whereby the rollers are made to gradually rise and fall and thus to travel around on the interior surface of the die on a zigzag line, as and for the purpose set forth.

4. In a centrifugal pulverizing-mill, a series of two or more rollers mounted on the upper ends of a corresponding series of two or more vertical roller-shafts, said shafts having trunnion-bearings at the lower ends thereof on a supporting and operating pulley, the said pulley having its support on and operated by a central vertical shaft, the said central shaft having its vertical support on a vertically-acting lever and the lever operated by any ordinary means, in combination with an inclosing chamber having an annular die at its upper end and a diaphragm next to and underneath the rollers having tubular openings covered with horizontally-adjustable washer-caps through which said openings and caps the roller-shafts extend, whereby the under-running machinery of the mill is protected from and unobstructed by the material being pulverized, substantially as and for the purpose described.

GEORGE R. KING.
ALBERT RAYMOND.

Witnesses:
JOS. C. SEGUINE,
S. P. EDWARDS.